(12) United States Patent
Hanada (10) Patent No.: US 6,938,431 B2
(45) Date of Patent: Sep. 6, 2005

(54) VEHICULAR COOLING SYSTEM USING AIR CONDITIONER REFRIGERANT

(75) Inventor: Tomoyuki Hanada, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/466,000

(22) PCT Filed: Oct. 2, 2002

(86) PCT No.: PCT/JP02/10255

§ 371 (c)(1),
(2), (4) Date: Jun. 30, 2003

(87) PCT Pub. No.: WO03/037666

PCT Pub. Date: May 8, 2003

(65) Prior Publication Data

US 2005/0097917 A1   May 12, 2005

(30) Foreign Application Priority Data

Oct. 30, 2001   (JP) ............................. 2001-332728

(51) Int. Cl.⁷ ........................... F25D 17/02; B60H 1/32
(52) U.S. Cl. ........................... 62/201; 62/434; 62/244; 165/202
(58) Field of Search ............................. 62/201, 98, 99, 62/434, 430, 244, 239; 165/202, 42, 43

(56) References Cited

U.S. PATENT DOCUMENTS

| 5,735,133 A | 4/1998 | Voss et al. |
| 6,112,543 A | 9/2000 | Feuerecker et al. |
| 6,370,903 B1 * | 4/2002 | Wlech ....................... 62/324.6 |

FOREIGN PATENT DOCUMENTS

| DE | 38 19 647 A1 | 12/1988 | |
| DE | 199 07 250 A1 | 8/2000 | |
| FR | 2 745 759 A1 | 9/1997 | |
| JP | 4-116660 U | 10/1992 | |
| JP | 06168730 A * | 6/1994 | ........... H01M 8/04 |
| JP | 10315750 A * | 12/1998 | ........... B60H 1/08 |
| JP | 11-337193 A | 12/1999 | |
| JP | 2000303836 A * | 10/2000 | ............. F01P 3/20 |

* cited by examiner

*Primary Examiner*—Chen Wen Jiang
(74) *Attorney, Agent, or Firm*—Foley & Lardner LLP (57) ABSTRACT

A cooling system for a vehicle which includes a coolant circuit (21) for circulating coolant to cool a unit (1) carried on the vehicle; a refrigerant circuit (41) for circulating refrigerant for an air conditioner of the vehicle; and a heat exchanger (15) connected to the coolant and refrigerant circuits (21, 41), provided with a storage medium (25) for storing cool of the refrigerant. The heat exchanger (15) carries out heat-exchanges between the coolant and the storage medium, and between the coolant and the refrigerant.

32 Claims, 6 Drawing Sheets

VEHICULAR COOLING SYSTEM USING AIR CONDITIONER REFRIGERANT

TECHNICAL FIELD

The present invention relates to a vehicular cooling system to cool a unit carried on a vehicle, particularly to a vehicular cooling system using air conditioner refrigerant as heat sink.

BACKGROUND ART

Japanese Utility Model Application Laid-Open No. 4-116660 discloses a fuel cooling system using air conditioner refrigerant to suppress fuel temperature rise.

Japanese Patent Application Laid-Open No. 11-337193 discloses a cooling system for a motor or an inverter using air conditioner refrigerant.

DISCLOSURE OF INVENTION

Power generating unit of a vehicle, such as an internal combustion engine (ICE), is efficiently cooled by coolant, temperature of which is sufficiently higher than outside air temperature. Refrigerant has never been used for cooling the unit.

Fuel cell is also cooled by coolant, and is not suitable for a direct cooling by refrigerant. For some fuel cells, refrigerant lines cannot be installed inside.

A radiator is employed, in the same manner as that of an ICE powered vehicle, to remove heat in the coolant of the fuel cell. Required cooling capacity of the radiator during high power operation is approximately equal to that of the ICE radiator. For a stable operation, the coolant of the fuel cell is required to be kept lower in temperature than that of the ICE. Because of the smaller temperature difference between the coolant and the outside air, the radiator for the fuel cell needs to have larger contact area with the outside air than the ICE radiator to secure the required cooling capacity, resulting in a size of the radiator exceeding allowable limit for mounting on the vehicle, otherwise output power of the vehicle is sacrificed to keep down heat generation.

An object of the present invention is to provide a vehicular cooling system for a unit carried on a vehicle, with enhanced cooling capacity.

An aspect of the present invention is a cooling system for a vehicle comprising: a coolant circuit for circulating coolant to cool a unit carried on the vehicle; a refrigerant circuit for circulating refrigerant for an air conditioner of the vehicle; and a heat exchanger connected to the coolant and refrigerant circuits, provided with a storage medium for storing cool of the refrigerant, the heat exchanger carrying out heat-exchanges between the coolant and the storage medium, and between the coolant and the refrigerant.

BRIEF DESCRIPTION OF THE DRAWINGS

The invention will now be described with reference to the accompanying drawings wherein.

BEST MODE FOR CARRYING OUT THE INVENTION

Embodiments of the present invention will be explained below with reference to the drawings, wherein like members are designated by like reference characters.

Figure 1:
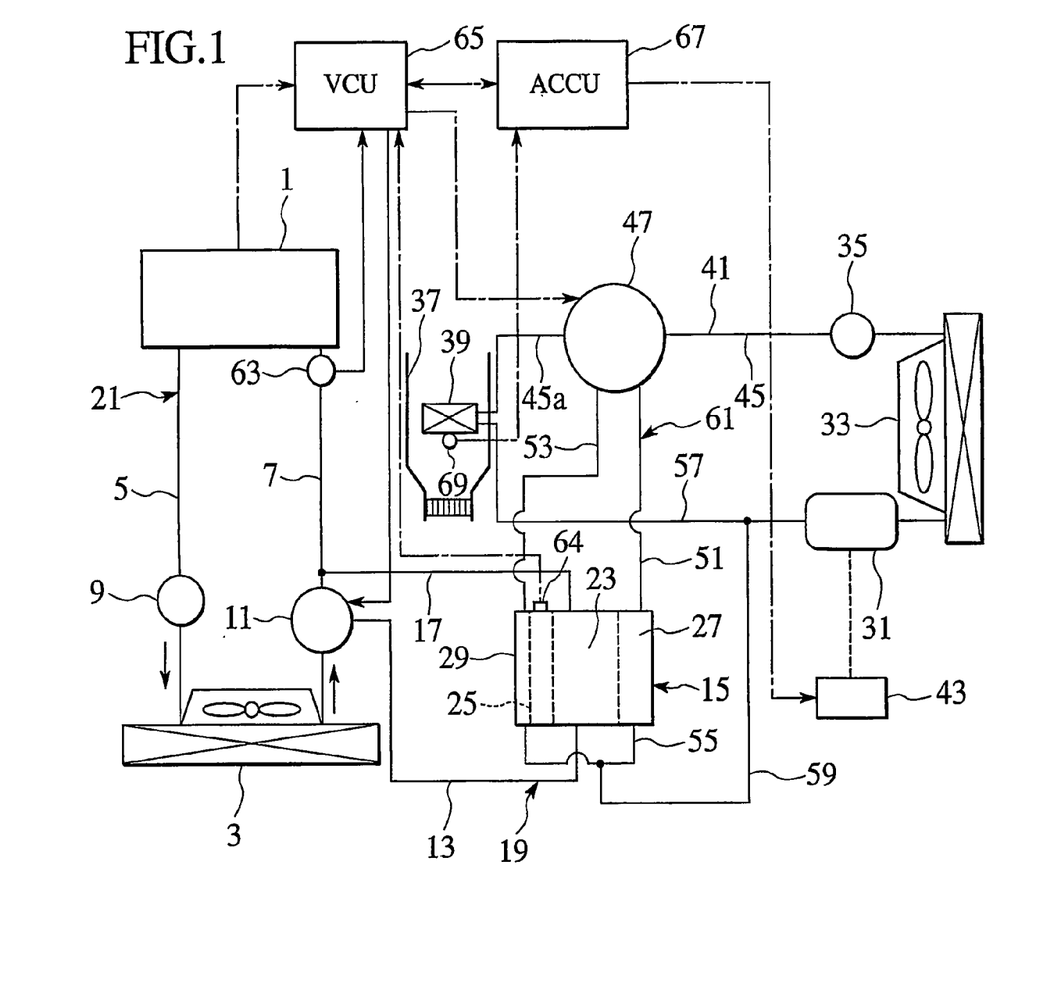
FIG. 1 is a schematic diagram showing an entire configuration of a vehicular cooling system according to a first embodiment of the present invention.

As shown in FIG. 1, a fuel cell 1 as a unit carried on a vehicle is connected to a radiator 3 by lines 5 and 7. The line 5 has a water pump 9 installed therein, and cooling water as coolant discharged therefrom flows to the radiator 3. The line 7 has a coolant line switching valve 11 installed therein, which is connected to a lower side in the drawing of a heat exchanger 15 by a line 13. The line 7 between the coolant line switching valve 11 and the fuel cell 1 is connected to an upper side in the drawing of the heat exchanger 15 by a line 17.

The lines 13 and 17 constitute a coolant bypass 19. The lines 5 and 7, and the coolant bypass 19 constitute a coolant circuit 21 of a cooling system for the fuel cell 1. By operating the coolant line switching valve 11, cooling water discharged from the radiator 3 is switched between a state of flowing through the coolant bypass 19 and the heat exchanger 15 to the fuel cell 1, and a state of flowing not through the coolant bypass 19 but directly from the coolant line switching valve 11 to the fuel cell 1. This enables controlling a temperature of the cooling water in dependence to a temperature situation of the fuel cell 1, whereby the temperature of the cooling water is stabilized.

Figure 2:
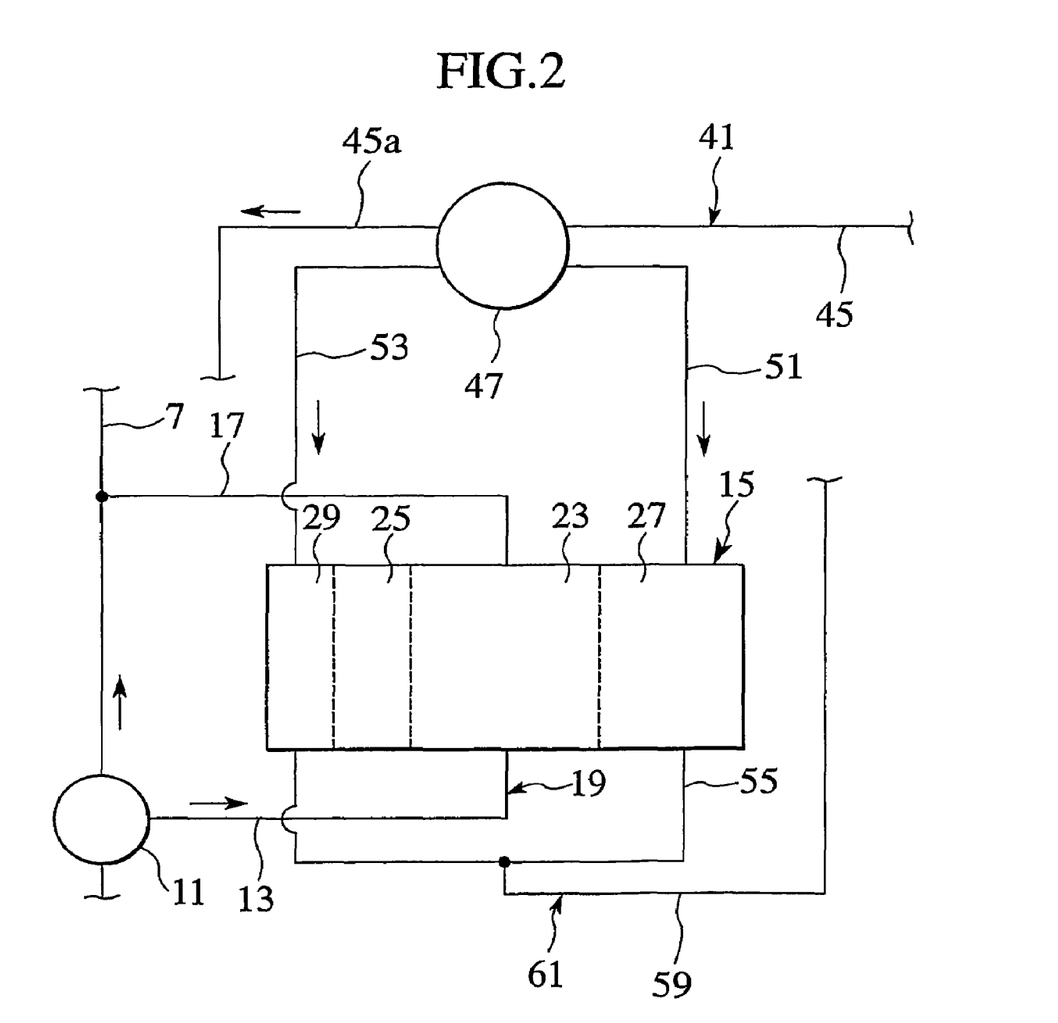
FIG. 2 is a schematic diagram showing a heat exchanger, and a flow of refrigerant and coolant in the vehicular cooling system of FIG. 1.

As shown in FIG. 2, the heat exchanger 15 includes a coolant region 23, to which the lines 13 and 17 are connected. A storage medium 25 is arranged on the left side of the coolant region 23 in the drawing and, on its right side, a first refrigerant region 27 is arranged, which refrigerant used for a vehicular air conditioner as a heat sink, described later, flows into. A second refrigerant region 29 is arranged on a side of the storage medium 25 opposite the coolant region 23. At the heat exchanger 15, heat-exchanges can be carried out between the cooling water of the coolant region 23 and the refrigerant of the first refrigerant region 27, between the refrigerant of the second refrigerant region 29 and the storage medium 25, and between the cooling water of the coolant region 23 and the storage medium 25. Accordingly, the cooling water of the fuel cell 1 can be efficiently cooled by the refrigerant for the air conditioner, and the storage medium 25 which stores cool of the refrigerant, whereby cooling capacity of the cooling system for the fuel cell 1 is enhanced.

As shown in FIG. 1, the vehicular air conditioner, i.e., an air conditioner unit installed in the vehicle, includes an electric compressor 31, a condenser 33 for condensing a flown-in refrigerant discharged from the electric compressor 31, a liquid tank 35, and an evaporator 39 in a duct 37 connected with the inside of a car room to evaporate liquid refrigerant, which are all connected constituting a refrigerant circuit 41. The electric compressor 31 is controlled by an electric compressor inverter 43.

A line 45 between the evaporator 39 and the liquid tank 35 has a refrigerant line switching valve 47 installed therein. This refrigerant line switching valve 47 is connected to an upper side in the drawing of the first refrigerant region 27 of the heat exchanger 15 by a line 51, and to an upper side in the drawing of the second refrigerant region 29 of the heat exchanger 15 by a line 53. Lower sides in the drawing of the first and second refrigerant regions 27 and 29 are connected to each other by a line 55. The line 55 and a line 57 between the electric compressor 31 and the evaporator 39 are connected to each other by a line 59. The lines 51, 53, 55 and 59 constitute a refrigerant bypass 61. By operating the refrigerant line switching valve 47, refrigerant from the liquid tank 35 is switched to a state of flowing to the evaporator 39 through a line 45a, a state of flowing to the line 51, a state of flowing to both of the lines 45a and 51, or a state of flowing to both of the lines 45a and 53. Flow of the refrigerant into the refrigerant bypass 61 is controlled in dependence to the temperature situation of the fuel cell 1 or a running condition of the air conditioner. The temperature of the cooling water is lowered with minimized influences on air conditioner performance.

In the line 7 before the fuel cell 1, a water temperature sensor 63 is provided for detecting a cooling water temperature, and the storage medium 25 is provided with a temperature sensor 64 for detecting its temperature. A detection value of each of the water temperature sensors 63 and 64 is sent to a vehicular control unit (VCU) 65 as a control unit. Receiving an output value from the fuel cell 1 and the detection values from the water temperature sensors 63 and 64, the VCU 65 outputs operation signals to the coolant line switching valve 11 and the refrigerant line switching valve 47.

The electric compressor inverter 43 receives an operation signal from an air conditioner control unit (ACCU) 67 to control the electric compressor 31. A detection value of an atmosphere temperature sensor 69 downstream the evaporator 39 is sent to the ACCU 67.

Figure 3:
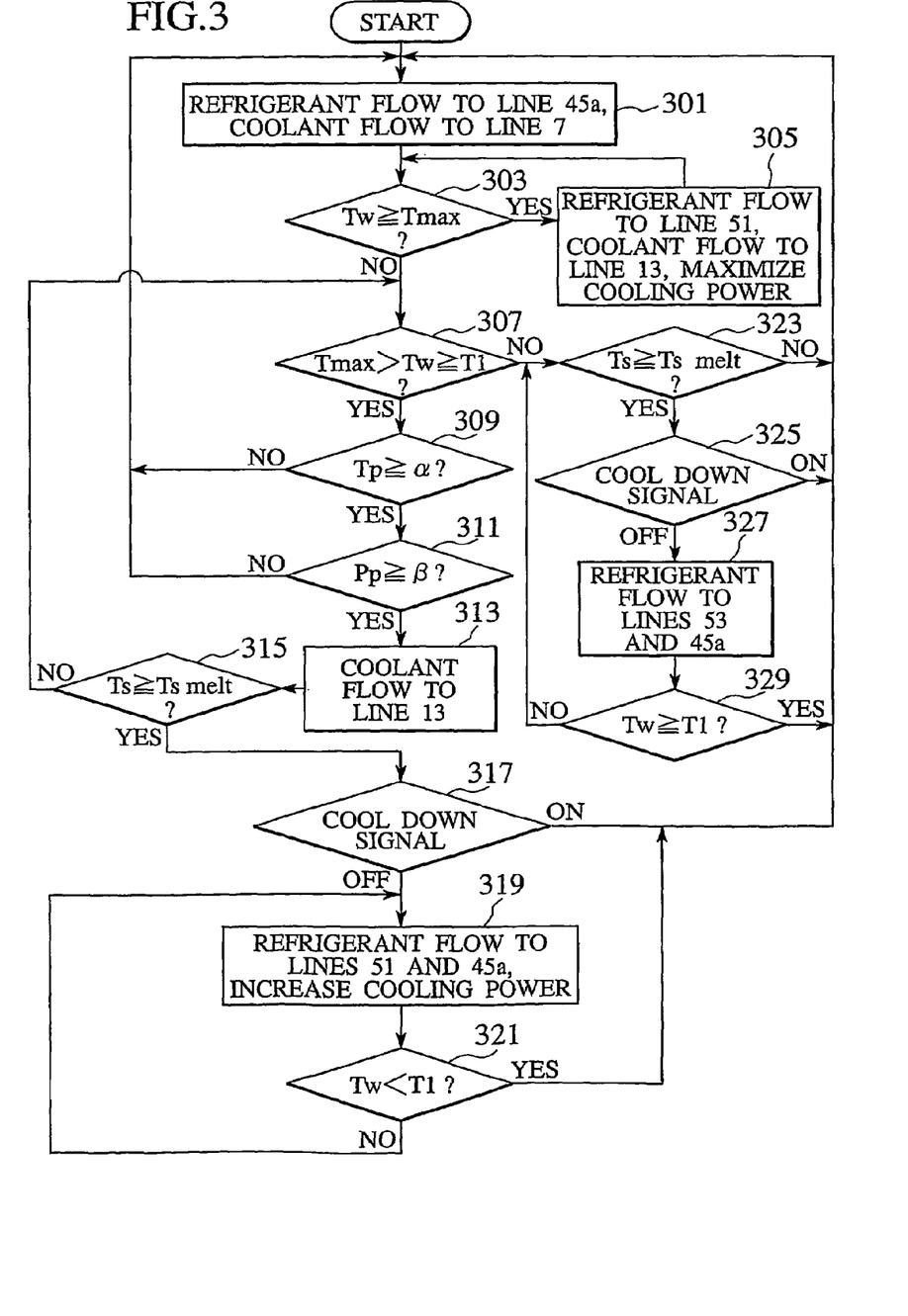
FIG. 3 is a flowchart showing an operation of the vehicular cooling system of FIG. 1.

Next, an operation of the foregoing vehicular cooling system will be described based on a flowchart shown in FIG. 3. When an ignition switch (IGN) of the vehicle is turned ON, the coolant line switching valve 11 is switched so that the coolant can directly flow from the coolant line switching valve 11 to the line 7 without flowing through the coolant bypass 19. The refrigerant line switching valve 47 is switched so that the refrigerant can directly flow from the refrigerant line switching valve 47 to the evaporator 39 through the line 45a without flowing through the refrigerant bypass 61 (step 301).

In this state, the VCU 65 takes in a cooling water temperature Tw detected by the water temperature sensor 63 to compare the temperature Tw with a predetermined value Tmax, and decides whether Tw≧Tmax is established or not (step 303). Herein, if Tw≧Tmax, which means a high driving load of the fuel cell 1 with insufficient heat removal at the radiator 3 causing the cooling water temperature to rise, is established, heat-exchange between the cooling water and the refrigerant is carried out at the heat exchanger 15 to lower the cooling water temperature. The predetermined value Tmax is set, for example, lower than a temperature of the fuel cell 1 at maximum load operation.

At this time, the coolant line switching valve 11 is switched to a state where the cooling water flows through the coolant bypass 19 (line 13). The refrigerant line switching valve 47 is switched to a state where the refrigerant flows through the line 51 to the first refrigerant region 27. The ACCU 67 outputs a signal to the electric compressor inverter 43 so as to maximize a cooling power and an amount of heat exchanged between the coolant and the refrigerant at the heat exchanger 15 (step 305).

By the switching of each of the line switching valves 11 and 47, the cooling water flows from the line 13 to the coolant region 23 of the heat exchanger 15, then flows to the line 17 and returns to the line 7. The refrigerant flows from the line 51 to the first refrigerant region 27, then flows to the lines 55 and 59, and returns to the line 57. Then, the refrigerant is sucked into the electric compressor 31. Accordingly, at the heat exchanger 15, the cooling water in the coolant region 23 absorbs cool from the refrigerant in the first refrigerant region 27. At this time, the fuel cell 1 is sufficiently cooled by the cooling water effectively cooled by the refrigerant of the maximized cooling power.

If the cooling water temperature Tw is lower than the predetermined value Tmax, the cooling water temperature Tw is compared with a second predetermined value T1 lower than the predetermined value Tmax, and decision is made as to whether the cooling water temperature Tw is lower than the predetermined value Tmax and equal to or higher than the second predetermined value T1, i.e., Tmax>Tw≧T1 is established or not (step 307). Herein, if Tmax>Tw≧T1 is established, the VCU 65 calculates a water temperature increase rate of the cooling water Tp=ΔTw(° C.)/ΔS(s), and an increase rate of an average output of the fuel cell 1 per unit time Pp=ΔPwave(kW)/ΔS(s), respectively by a temperature increase rate calculating unit and an output increase rate calculating unit, and decides whether the increase rates Tp and Pp are respectively equal to or higher than set values α and β (steps 309 and 311).

Figure 4:
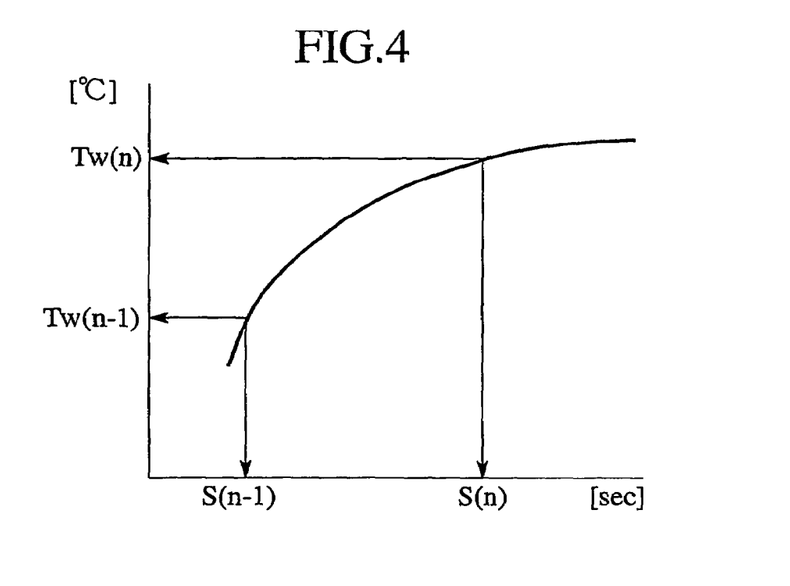
FIG. 4 is a graph of cooling water temperature explaining an increase rate of the cooling water temperature.
Figure 5:
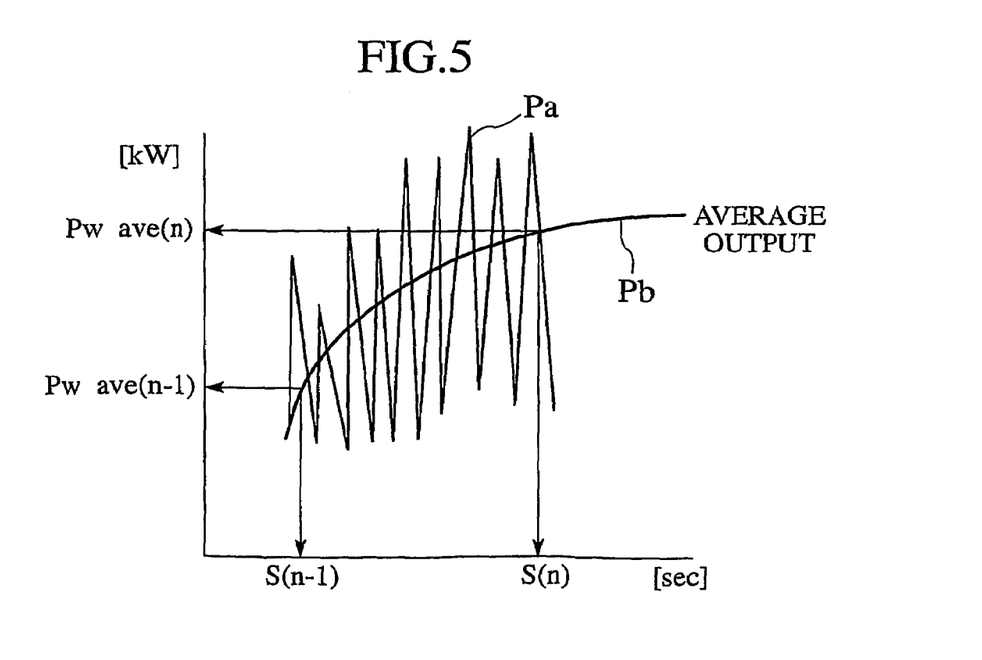
FIG. 5 is a graph of an average fuel cell output per unit time explaining an increase rate of the average fuel cell output.

In this case, as shown in FIG. 4, with an abscissa axis indicating time [sec.], and an ordinate axis a cooling water temperature [° C.], the water temperature increase rate Tp is represented by {Tw(n)-Tw(n-1)}/{S(n)-S(n-1)}. As shown in FIG. 5, with an abscissa axis indicating time [sec.], and an ordinate axis the average output [kW], the average output increase rate Pp is represented by {Pwave(n)-Pwave(n-1)}/{S(n)-S(n-1)}. In FIG. 5, a polygonal line Pa represents a real output of the fuel cell 1, and a curve Pb an average value of real outputs per unit time.

In the case the output of the fuel cell 1 as well as the temperature of the cooling water fluctuates a lot, if the increase rates Tp and Pp are determined to be respectively equal to or higher than the predetermined values α and β, the coolant line switching valve 11 is switched to a state where the cooling water flows through the coolant bypass 19 (line 13) (step 313). At this time, the refrigerant line switching valve 47 is maintained in the initial state where the refrigerant flows only to the air conditioner line 45a without flowing through the refrigerant bypass 61.

Thus, the cooling water flows into the coolant region 23 of the heat exchanger 15, and the cooling water in this coolant region 23 is cooled by heat-exchange with the storage medium 25 containing the cool stored beforehand from the refrigerant. Operation of storing cool in the storage medium 25 is carried out by switching the refrigerant line switching valve 47 so that the refrigerant flows through the line 53 to reach the second refrigerant region 29 to carry out heat-exchange with the storage medium 25.

As described above, when the output of the fuel cell 1 fluctuates a lot and so does the temperature of the cooling water accordingly, the heat-exchange with the storage medium 25 stabilizes the cooling water temperature and suppresses the change thereof.

Then, decision is made as to whether a temperature of the storage medium Ts detected by the temperature sensor 64 is equal to or higher than a melting point of the storage medium Tsmelt as a stipulated value, i.e., Ts≧Tsmelt is established or not (step 315). Herein, if Ts≧Tsmelt is established, the ACCU 67 decides whether a cool-down signal is ON or not, the cool-down signal being ON when a car room temperature is higher by a given range compared to a set temperature of the air conditioner (step 317).

In this case, if the cool-down signal is OFF and if the car room temperature is low, the refrigerant line switching valve 47 is switched to a state where the refrigerant flows to the line 51 and to the evaporator 39 through the line 45a (step 319). Accordingly, the refrigerant flowing through the line 51 into the first refrigerant region 27 is subjected to beat-exchange with the cooling water in the coolant region 23 in place of the storage medium 25, which has reached the melting point Tsmelt or more, and the cooling water is continuously cooled.

Also at this time, by increasing a cooling power according to demand (step 319), it is possible to increase the amount of heat exchanged between the cooling water and the refrigerant without affecting air conditioning performance.

Then, decision is made as to whether the cooling water temperature Tw has dropped below the second predetermined value T1, i.e., Tw<T1 is established or not (step 321). Herein, if Tw<T1 is established, it is not necessary to cool the cooling water. Thus, the process returns to the step 301, where the cooling of the cooling water by the refrigerant is stopped.

If the cool-down signal is ON in the step 317, since it is necessary to place priority on cooling of the inside of the car room, the process returns to the step 301, where the cooling of the cooling water by the refrigerant is stopped.

The flowing of the cooling water into the coolant bypass 19 is controlled in dependence to the above-described increase rates Tp and Pp of the cooling water temperature Tw and the average output Pwave. Thus, the temperature of the cooling water is accurately and quickly controlled in dependence to the state of the fuel cell 1 to be stabilized more, whereby an operation of the cooling system is limited to the minimum necessary. In this case, an amount of fluctuation in the cooling water temperature Tw is reduced, and the temperature changes of the fuel cell 1 are suppressed, thus enhancing the performance of the fuel cell 1.

If in the step 307, Tmax>Tw≧T1 is not established and the cooling temperature Tw is lower than the second predetermined value T1, decision is made as to whether the temperature Ts of the storage medium 25 detected by the temperature sensor 64 is equal to or higher than the melting point Tsmelt as the stipulated value or not (step 323). Herein, if Ts≧Tsmelt is established, decision is made as to whether the cool-down signal is ON or not (step 325). If the cool-down signal is OFF, and if the temperature in the car room is low, the refrigerant line switching valve 47 is switched to a state where the refrigerant flows to the line 53 and to the evaporator 39 through the line 45a (step 327). Accordingly, the refrigerant flowing through the line 53 into the second refrigerant region 29 exchanges heat with the storage medium 25, and cool is stored in the storage medium 25, which has reached the melting point Tsmelt or more.

If the temperature Ts of the storage medium 25 is lower than Tsmelt in the step 323, and if the cool-down signal is ON in the step 325, the operation of storing cool in the storage medium 25 is made unnecessary, while cooling is necessary in the car room. Therefore, the process returns to the step 301, where the coolant and refrigerant line switching valves 11 and 47 are both returned to the initial states.

Thus, it is possible to store the cool for cooling the cooling water in the storage medium 25 without affecting the air conditioning performance.

Then, decision is made as to whether the cooling water temperature Tw is equal to or higher than the above-described second predetermined value T1 or not (step 329). Herein, if Tw≧T1 is established and if the cooling water temperature is increased, the process returns to the step 301. Conversely, if the cooling water temperature Tw is lower than the second predetermined value T1, the process returns to the step 323, and the operations thereafter are repeated.

Figure 6:
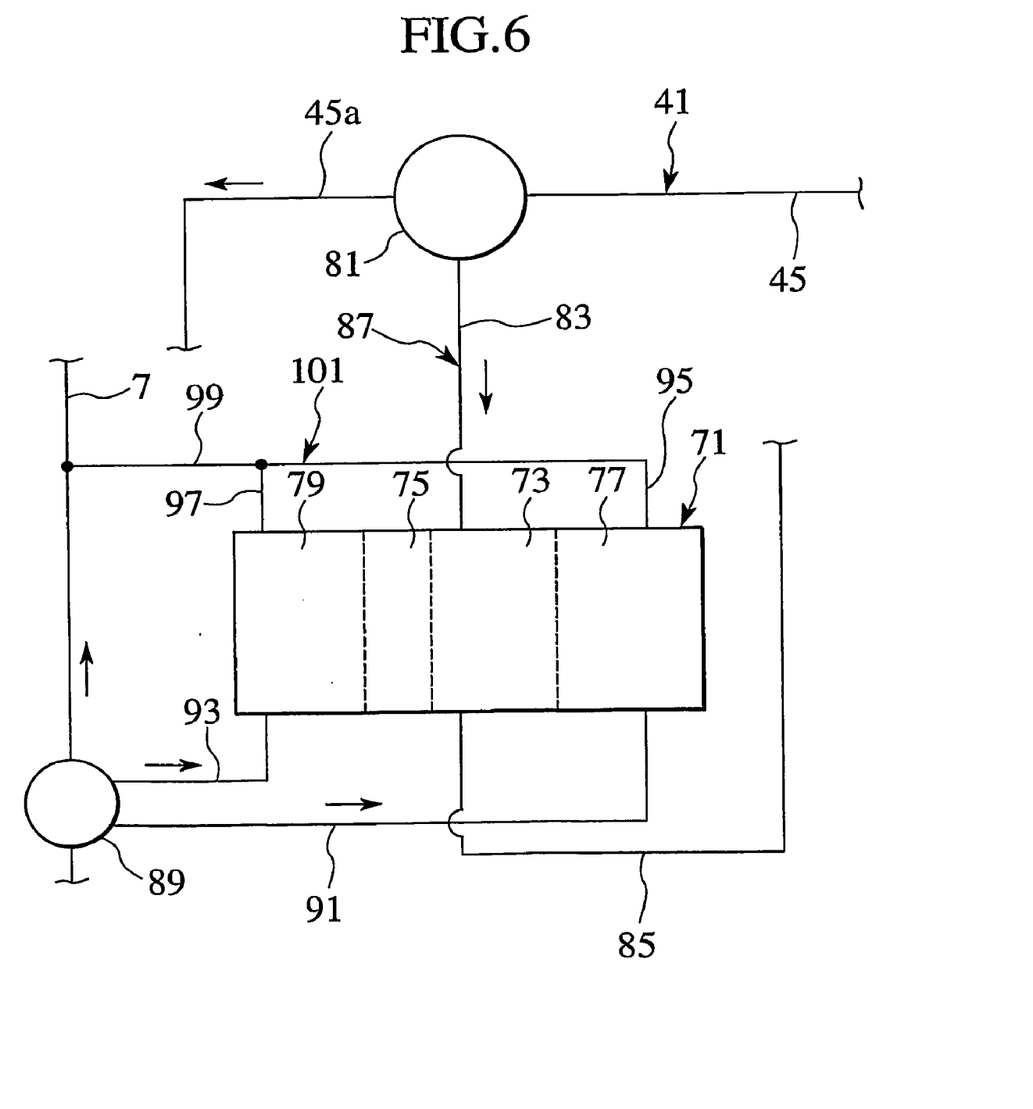
FIG. 6 is a schematic diagram showing a heat exchanger, and a flow of refrigerant and coolant in a vehicular cooling system according to a second embodiment of the present invention.

According to a second embodiment of the present invention shown in FIG. 6, a heat exchanger 71 includes a refrigerant region 73, through which refrigerant passes. A storage medium 75 is arranged on the left side in the drawing of the coolant region 73 and, on its right side, a first coolant region 77 is arranged, into which cooling water flows. A second coolant region 79 is arranged on a side of the storage medium 75 opposite the coolant region 73. Specifically, at the heat exchanger 71, heat can be exchanged between the cooling water of the first coolant region 77 and the refrigerant of the refrigerant region 73, between the refrigerant of the refrigerant region 73 and the storage medium 75, and between the cooling water of the coolant region 79 and the storage medium 75.

A refrigerant line switching valve 81 installed in the refrigerant circuit 41 is connected to an upper side in the drawing of the refrigerant region 73 by a line 83, and a lower side in the drawing of the refrigerant region 73 is connected to the line 57 between the electric compressor 31 and the evaporator 39 of FIG. 1 by a line 85. The lines 83 and 85 constitute a refrigerant bypass 87. A switching operation of the refrigerant line switching valve 81 enables refrigerant flowing in from the liquid tank 35 to be switched between a state of flowing to the evaporator 39 through the line 45a and a state of flowing to the line 83, or even to a state of flowing to both.

A coolant line switching valve 89 installed in the line 7 is connected to lower sides in the drawing of the first and second coolant regions 77 and 79 respectively by lines 91 and 93. Lines 95 and 97 are respectively connected to uppers sides in the drawing of the first and second coolant regions 77 and 79. These lines 95 and 97 are connected through a line 99 to the line 7. The lines 91, 93, 95, 97 and 99 constitute a coolant bypass 101, and the coolant bypass 101 and the lines 5 and 7 constitute the coolant circuit 21.

Specifically, in the example of FIG. 2, the refrigerant bypass line has two lines 51 and 53, and the coolant bypass line has one line 13. With such a structure, switching is executed by the refrigerant line switching valve 47 between the cooling of the cooling water by the refrigerant and that by the storage medium 25. On the other band, in the example of FIG. 6, the refrigerant bypass line has one line 83, the coolant bypass line has two lines 91 and 93. Switching is executed by the coolant line switching valve 89 between cooling of the cooling water by the refrigerant and that by the storage medium 75.

Figure 7:
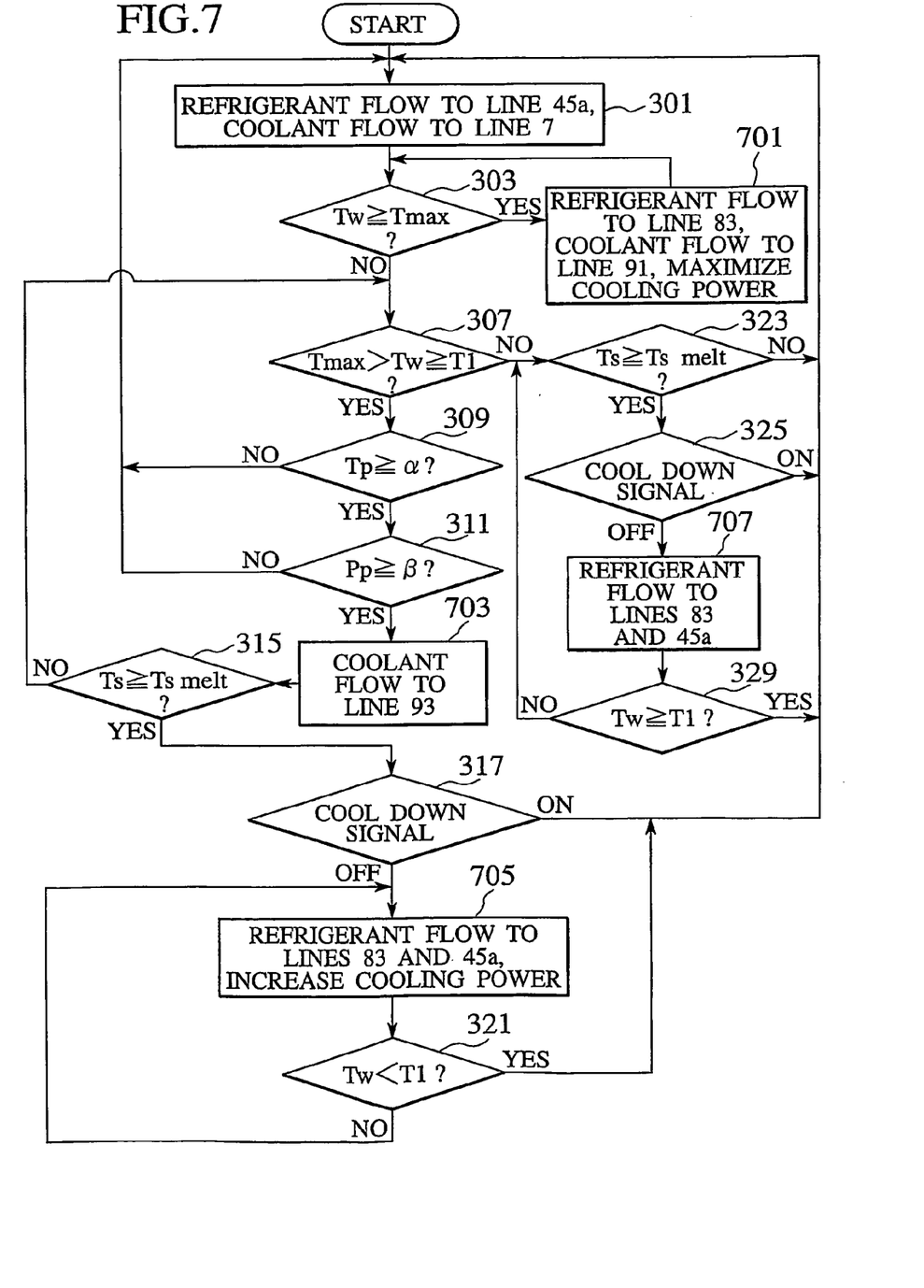
FIG. 7 is a flowchart showing an operation of the vehicular cooling system of FIG. 6.

FIG. 7 is a flowchart showing an operation of the vehicular cooling system of FIG. 6. Herein, only operation process different from those of the flowchart of FIG. 3 are described.

When the cooling water temperature Tw is equal to or higher than Tmax (step 303), the coolant line switching valve 89 is switched to a state where the cooling water flows through the line 91 into the first coolant region 71. The refrigerant line switching valve 81 is switched to a state where the refrigerant flows through the line 83 into the refrigerant region 73, cooling power is maximized by the ACCU 67, and an amount of heat exchanged between the cooling water and the refrigerant is maximized at the heat exchanger 71 (step 701). Accordingly, in a state of a high cooling water temperature, priority is placed on lowering of the cooling water temperature, and the cooling water is effectively cooled.

If the cooling water temperature Tw is lower than Tmax and equal to or higher than T1 (step 307), and if the increase rate Tp of the cooling water temperature and the increase rate Pp of the average output are respectively equal to or higher than set values α and β (steps 309 and 311), the coolant line switching valve 89 is switched to a state where the cooling water flows through the line 93 (step 703). The refrigerant line switching valve 81 is maintained in an initial state where the refrigerant only flows to the air conditioner line 45*a* without flowing through the refrigerant bypass 87.

Thus, the cooling water flows into the second coolant region 79 of the heat exchanger 71, and the cooling water in this second coolant region 79 is cooled by the storage medium 75 containing the cool stored beforehand from the refrigerant.

Further, when a temperature Ts of the storage medium 75 is equal to or higher than a melting point Tsmelt (step 315), and when a cool-down signal is OFF (step 317), the refrigerant line switching valve 81 is switched to a state where the refrigerant flows to the line 83 and to the evaporator 39 through the line 45*a* (step 705). Accordingly, the refrigerant flowing through the line 83 into the refrigerant region 73 is subjected to heat-exchange with the cooling water in the second coolant region 79 through the storage medium 75 which has reached the melting point Tsmelt or more, and the cooling water is continuously cooled.

Also at this time, by increasing the cooling power according to demand (step 709), it is possible to increase the amount of the heat exchanged between the cooling water and the refrigerant without affecting air conditioning performance.

If the cooling temperature drops below T1 (step 307), and if the temperature Ts of the storage medium 75 is equal to or higher than the melting point Tsmelt (step 323) and the cool-down signal is OFF (step 325), the refrigerant line switching valve 81 is switched to a state where the refrigerant flows to the line 83, and the line 45*a* to the evaporator 39 (step 707). Accordingly, the refrigerant flowing through the line 83 into the refrigerant region 73 exchanges heat with the storage medium 75, and cool is stored in the storage medium 75, which has reached the melting point Tsmelt or more.

The present disclosure relates to subject matter contained in Japanese Patent Application No. 2001-332728, filed on Oct. 30, 2001, the disclosure of which is expressly incorporated herein by reference in its entirety.

The invention may be practiced or embodied in still other ways without departing from the spirit or essential character thereof. The fuel cell was used as the unit carried on the vehicle in each of the foregoing embodiments, however, as long as a temperature of coolant is about 80° C., the unit may be a driving motor.

The preferred embodiment described herein is therefore illustrative and not restrictive, the scope of the invention being indicated by the claims and all variations which come within the meaning of claims are intended to be embraced therein.

INDUSTRIAL APPLICABILITY

As described above, according to the vehicular cooling system of the present invention, the coolant for cooling the unit carried on the vehicle exchanges heat with the air conditioner refrigerant and the storage medium in which the cool of the refrigerant is stored, at the heat exchanger connected to the coolant and refrigerant circuits. Thus, the coolant is sufficiently and stably cooled, thereby improving the cooling capacity of the system.

Furthermore, the line switching valves respectively provided in the coolant and refrigerant circuits are controlled to make optimum combinations of the heat-exchange between the refrigerant and the coolant, between the coolant and the storage medium, and between the storage medium and the refrigerant. Thus, the cooling of the unit can be carried out, flexibly and quickly dealing with changes in the coolant temperature, the coolant temperature increase rate, the unit output increase rate, the temperature of the storage medium, the temperature in the car room, and the like. Therefore, the system is useful as a vehicular cooling system.

What is claimed is:

1. A cooling system for a vehicle comprising:
   a coolant circuit for circulating coolant to cool a unit carried on the vehicle;
   a refrigerant circuit for circulating refrigerant for an air conditioner of the vehicle; and
   a heat exchanger connected to the coolant and refrigerant circuits, provided with a storage medium for storing cool of the refrigerant, the heat exchanger carrying out heat-exchanges between the coolant and the storage medium, and between the coolant and the refrigerant.

2. The cooling system for a vehicle according to claim 1, further comprising:
   a coolant bypass provided in the coolant circuit, connected to the heat exchanger; and
   a coolant line switching valve for switching flow of the coolant into the coolant bypass on and off.

3. A cooling system for a vehicle according to claim 1, further comprising:
   a refrigerant bypass provided in the refrigerant circuit, connected to the heat exchanger; and
   a refrigerant line switching valve for switching flow of the refrigerant into the refrigerant bypass on and off.

4. A cooling system for a vehicle according to claim 3, wherein the refrigerant line switching valve can be switched to allow the refrigerant to flow to either the heat exchanger or an evaporator of the air conditioner, or both of the heat exchanger and the evaporator.

5. A cooling system for a vehicle according to claim 1, wherein the unit is a fuel cell.

6. A vehicle, comprising:
   a cooling system according to claim 5.

7. A vehicle, comprising:
   a cooling system according to claim 1.

8. A cooling system for a vehicle comprising:
   a coolant circuit for circulating coolant to cool a unit carried on the vehicle;
   a refrigerator circuit for circulating refrigerant for an air conditioner of the vehicle; and
   a heat exchanger connected to the coolant and refrigerant circuits, provided with a storage medium for storing cool of the refrigerant, the heat exchanger carrying out heat-exchanges between the coolant and the storage medium, and between the coolant and the refrigerant; wherein the heat exchanger includes:
a coolant region arranged on one side of the storage medium, connected to the coolant circuit;
a first refrigerant region arranged on a side of the coolant region opposite the storage medium, connected to the refrigerant circuit; and
a second refrigerant region arranged on the other side of the storage medium, connected to the refrigerant circuit, and wherein
the heat exchanger carries out heat-exchanges between the coolant and the storage medium, between the coolant and the refrigerant, and between the storage medium and the refrigerant.

9. A cooling system for a vehicle according to claim 8, wherein the unit is a fuel cell.

10. A cooling system for a vehicle comprising:
a coolant circuit for circulating coolant to cool a unit carried on the vehicle;
a refrigerator circuit for circulating refrigerant for an air conditioner of the vehicle; and
a heat exchanger connected to the coolant and refrigerant circuits, provided with a storage medium for storing cool of the refrigerant, the heat exchanger carrying out heat-exchanges between the coolant and the storage medium, and between the coolant and the refrigerant; wherein
the heat exchanger includes:
a refrigerant region on one side of the storage medium, connected to the refrigerant circuit;
a first coolant region arranged on a side of the refrigerant region opposite the storage medium, connected to the coolant circuit; and
a second coolant region arranged on the other side of the storage medium, connected to the coolant circuit wherein
the heat exchanger carries out heat-exchanges between the refrigerant and the storage medium, between the refrigerant and the coolant, and between the storage medium and the coolant.

11. A cooling system for a vehicle according to claim 10, wherein the unit is a fuel cell.

12. A cooling system for a vehicle comprising:
a coolant circuit for circulating coolant to cool a unit carried on the vehicle;
a refrigerator circuit for circulating refrigerant for an air conditioner of the vehicle;
a heat exchanger connected to the coolant and refrigerant circuits, provided with a storage medium for storing cool of the refrigerant, the heat exchanger carrying out heat-exchanges between the coolant and the storage medium, and between the coolant and the refrigerant;
a coolant bypass provided in the coolant circuit, connected to the heat exchanger;
a coolant line switching valve for switching flow of the coolant into the coolant bypass on and off;
a temperature increase rate calculating unit for calculating an increase rate of a temperature of the coolant;
a output increase rate calculating unit for calculating an increase rate of an output of the unit; and
a control unit for controlling switching of the coolant line switching valve in dependence to the calculated coolant temperature and unit output increase rates.

13. A cooling system for a vehicle according to claim 12, wherein the coolant line switching valve is controlled to turn on the flow of the coolant into the coolant bypass to carry out heat-exchange between the coolant and the storage medium, as the calculated coolant temperature and unit output increase rates are respectively equal to or higher than respective set values.

14. A cooling system for a vehicle according to claim 12, wherein the unit is a fuel cell.

15. A cooling system for a vehicle comprising:
a coolant circuit for circulating coolant to cool a unit carried on the vehicle;
a refrigerant circuit for circulating refrigerant for an air conditioner of the vehicle;
a heat exchanger connected to the coolant and refrigerant circuits, provided with a storage medium for storing cool of the refrigerant, the heat exchanger carrying out heat-exchanges between the coolant and the storage medium, and between the coolant and the refrigerant;
a coolant bypass provided in the coolant circuit, connected to the heat exchanger;
a coolant line switching valve for switching flow of the coolant into the coolant bypass on and off;
a refrigerant bypass provided in the refrigerant circuit, connected to the heat exchanger;
a refrigerant line switching valve for switching flow of the refrigerant into the refrigerant bypass on and off; and
a control unit for controlling the coolant line switching valve to allow the coolant to flow into the coolant bypass and the refrigerant line switching valve to allow the refrigerant to flow into the refrigerant bypass, as coolant temperature is equal to or higher than a first predetermined value.

16. A cooling system for a vehicle according to claim 15, wherein the coolant line switching valve is controlled in dependence to increase rates of the coolant temperature and an output of the unit, and the refrigerant line switching valve is controlled in dependence to a temperature of the storage medium, as the coolant temperature is lower than the first predetermined value and equal to or higher than a second predetermined value.

17. A cooling system for a vehicle according to claim 16, wherein the coolant and refrigerant line switching valves are controlled to carry out heat-exchange between the storage medium and the refrigerant, as the temperature of the coolant is lower than the second predetermined value, the temperature of the storage medium is equal to or higher than a stipulated value, and a temperature in a car room is higher than a setting temperature by a predetermined range.

18. A cooling system for a vehicle according to claim 17, wherein a compressor of the air conditioner comprises an electric compressor for variable cooling power, and the cooling power is increased, as heat-exchange between the storage medium and the refrigerant is carried out to store the cool of the refrigerant in the storage medium.

19. A cooling system for a vehicle according to claim 15, wherein a compressor of the air conditioner comprises an electric compressor for a variable cooling power, and the cooling power is increased, as heat-exchange between the coolant and the refrigerant is carried out.

20. A cooling system for a vehicle according to claim 15, wherein the unit is a fuel cell.

21. A cooling method for a unit carried on a vehicle, comprising:
connecting a coolant circuit for circulating coolant to cool the unit, and a refrigerant circuit for circulating a refrigerant for an air conditioner of the vehicle to a heat exchanger including a storage medium, a coolant region connected to the coolant circuit, and first and second refrigerant regions connected to the refrigerant circuit, the heat exchanger being capable of performing a first heat-exchange between coolant of the coolant region and refrigerant of the first refrigerant region, a second heat-exchange between the storage medium and refrigerant of the second refrigerant region, and a third heat-exchange between the coolant and the storage medium;

carrying out the first heat-exchange by using a coolant line switching valve provided in the coolant circuit to cause the coolant to flow into the coolant region of the heat exchanger, and by using a refrigerant line switching valve provided in the refrigerant circuit to cause the refrigerant to flow into the first refrigerant region of the heat exchanger;

carrying out the second heat-exchange by using the coolant line switching valve to shut off the flowing of the coolant into the heat exchanger, and by using the refrigerant line switching valve to cause the refrigerant to flow into the second refrigerant region of the heat exchanger;

carrying out the third heat-exchange by using the refrigerant line switching valve to shut off the flowing of the refrigerant into the heat exchanger, and by using the coolant line switching valve to cause the coolant to flow into the coolant region of the heat exchanger; and stopping the first, second and third heat-exchanges by using the refrigerant line switching valve to shut off the flowing of the refrigerant into the heat exchanger, and by using the coolant line switching valve to shut off the flowing of the coolant into the heat exchanger.

22. A cooling method according to claim 21, further comprising:

calculating a temperature increase rate of the coolant;

calculating an output increase rate of the unit, wherein the third heat-exchange is carried out when the temperature increase rate of the coolant and the output increase rate of the unit are respectively equal to or higher than setting values.

23. A cooling method according to claim 22, wherein the first heat-exchange is carried out, as a temperature of the coolant is equal to or higher than a first predetermined value.

24. A cooling method according to claim 23, wherein the third heat-exchange is carried out in dependence to the temperature increase rate of the coolant and the output increase rate of the unit, and the first heat-exchange is carried out in dependence to a temperature of the storage medium, as the temperature of the coolant is lower than the first predetermined value and equal to or higher than a second predetermined value lower than the first predetermined value.

25. A cooling method according to claim 24, wherein the second heat-exchange is carried out, as the temperature of the coolant is lower than the second predetermined value, the temperature of the storage medium is equal to or higher than a stipulated value, and a temperature in a car room is in a range of a given temperature from a set temperature.

26. A cooling method according to claim 21, wherein the unit is a fuel cell.

27. A method for cooling a unit carried on a vehicle, comprising:

connecting a coolant circuit for circulating coolant to cool the unit and a refrigerant circuit for circulating a refrigerant for an air conditioner of the vehicle to a heat exchanger including a storage medium, first and second coolant regions connected to the coolant circuit, and a refrigerant region connected to the refrigerant circuit, the heat exchanger being capable of performing a first heat-exchange between coolant of the first coolant region and refrigerant of the refrigerant region, a second heat-exchange between the storage medium and the refrigerant of the refrigerant region, and a third heat-exchange between coolant of the second coolant region and the storage medium;

carrying out the first heat-exchange by using a coolant line switching valve provided in the coolant circuit to cause the coolant to flow into the first coolant region of the heat exchanger, and by using a refrigerant line switching valve provided in the refrigerant circuit to cause the refrigerant to flow into the refrigerant region of the heat exchanger;

carrying out the second heat-exchange by using the coolant line switching valve to shut off the flowing of the coolant into the heat exchanger, and by using the refrigerant line switching valve to cause the refrigerant to flow into the refrigerant region of the heat exchanger;

carrying out the third heat-exchange by using the refrigerant line switching valve to shut off the flowing of the refrigerant into the heat exchanger, and by using the coolant line switching valve to cause the coolant to flow into the second coolant region of the heat exchanger;

stopping the first, second and third heat-exchanges by using the refrigerant line switching valve to shut off the flowing of the refrigerant into the heat exchanger, and by using the coolant line switching valve to shut off the flowing of the coolant into the heat exchanger; and carrying out the first and second heat-exchanges by using the coolant line switching valve provided in the coolant circuit to cause the coolant to flow into the second coolant region of the heat exchanger, and by using the refrigerant line switching valve provided in the refrigerant circuit to cause the refrigerant to flow into the refrigerant region of the heat exchanger.

28. A cooling method according to claim 27, wherein the unit is a fuel cell.

29. A cooling system for a vehicle comprising:

a coolant circuit for circulating coolant to cool a unit carried on the vehicle;

a refrigerant circuit for circulating refrigerant for an air conditioner of the vehicle; and a heat exchanger connected to the coolant and refrigerant circuits, provided with a storage medium including a substance adapted to be cooled by the refrigerant and store thermal energy resulting from cooling of the substance by the refrigerant, the heat exchanger being adapted to carry out heat-exchanges between the coolant and the storage medium cooled by the refrigerant, and between the coolant and the refrigerant.

30. A cooling system for a vehicle according to claim 29, wherein the unit is a fuel cell.

31. A vehicle, comprising:

a cooling system according to claim 30.

32. A vehicle, comprising:

a cooling system according to claim 29.

* * * * *